United States Patent [19]

Zuk

[11] 3,720,886

[45] March 13, 1973

[54] LOW DISTORTION SIGNAL OSCILLATOR

[75] Inventor: Paul Zuk, Allentown, Pa.

[73] Assignee: Bell Telephone Laboratories, Incorporated, Murray Hill, N.J.

[22] Filed: April 12, 1972

[21] Appl. No.: 243,290

[52] U.S. Cl. ....................331/110, 331/109, 331/142

[51] Int. Cl. ................................................H03b 5/12

[58] Field of Search........................331/110, 142, 109

[56] References Cited

UNITED STATES PATENTS

| | | | |
|---|---|---|---|
| 3,518,571 | 6/1970 | Feldman et al. | 331/142 |
| 3,518,572 | 6/1970 | Rao | 331/142 |
| 3,569,863 | 4/1971 | Cowpland | 331/142 |

*Primary Examiner*—John Kominski
*Attorney*—R. J. Guenther et al.

[57] ABSTRACT

In an oscillatory signal generator circuit, exceptionally low distortion is ensured by the use of a transistor common to multiple feedback loops that causes gain to be compressed as a logarithmic function of amplitude. Changes in output impedance or loop length are compensated for or equalized by shifting the compression threshold as a function of line voltage.

10 Claims, 6 Drawing Figures

LOW DISTORTION SIGNAL OSCILLATOR

BACKGROUND OF THE INVENTION

1. Field of the Invention

This invention relates to oscillator circuits and more particularly to oscillatory signal generators employing amplitude regulation and equalization.

2. Description of the Prior Art

Oscillators employing diverse transistor amplifiers having positive feedback loops that include frequency determining elements are well known in the prior art, being shown, for example, in U. S. Pat. No. 3,424,870 issued to R. L. Breeden and R. M. Rickert on Jan. 28, 1969. One typical use of such oscillators is in the field of telephone signaling where two of the circuits are combined to form a multifrequency dial signal generator capable of producing coincident pairs of signal tones in response to the manual operation of a pushbutton dial. To ensure maximum accuracy in dial signaling and attendant efficient use of the related central office signal receiving and switching equipment, it is essential for the signal oscillator outputs to be substantially free from all harmonic distortion. Another important requirement for such oscillators is the inclusion of some efficient means for ensuring accurate equalization so that both the frequency and the amplitude of generated signals remain virtually constant irrespective of the length of the connecting telephone loop.

In addition to the requirements indicated, it is highly desirable today that any dial signal oscillator circuit that is to be produced in quantity be fully compatible with integrated circuit fabrication techniques.

Oscillator circuits in the prior art have failed to meet fully all of the requirements discussed above, and, in addition, such circuits are typically characterized by undue complexity. It is common, for example, for the equalizer portion of the circuit to require a number of separate and distinct circuit components rather than being an integral part of the oscillator.

Accordingly, the general object of the invention is to overcome the indicated deficiencies.

SUMMARY OF THE INVENTION

The stated object and additional related objects are achieved in accordance with the principles of the invention by an oscillator circuit which includes a multistage transistor amplifier having an additional transistor that is common to a plurality of feedback loops. This arrangement ensures exceptionally low distortion by causing the amplifier gain to be compressed as a logarithmic function of amplitude.

In accordance with one important feature of the invention, loop length compensation or equalization in terms of both amplitude and frequency is achieved by circuitry which shifts the gain compression threshold as a function of line voltage which is, of course, directly dependent on loop length.

An oscillator constructed in accordance with the principles of the invention is further characterized by high input impedance, low driving impedance for the twin-T, frequency setting, feedback path filter, low harmonic distortion, and voltage gain that is substantially constant. The characteristics indicated combine to ensure that oscillator stability over a wide range of temperatures is limited almost exclusively by the characteristics of the twin-T filter.

DETAILED DESCRIPTION

Figure 1:
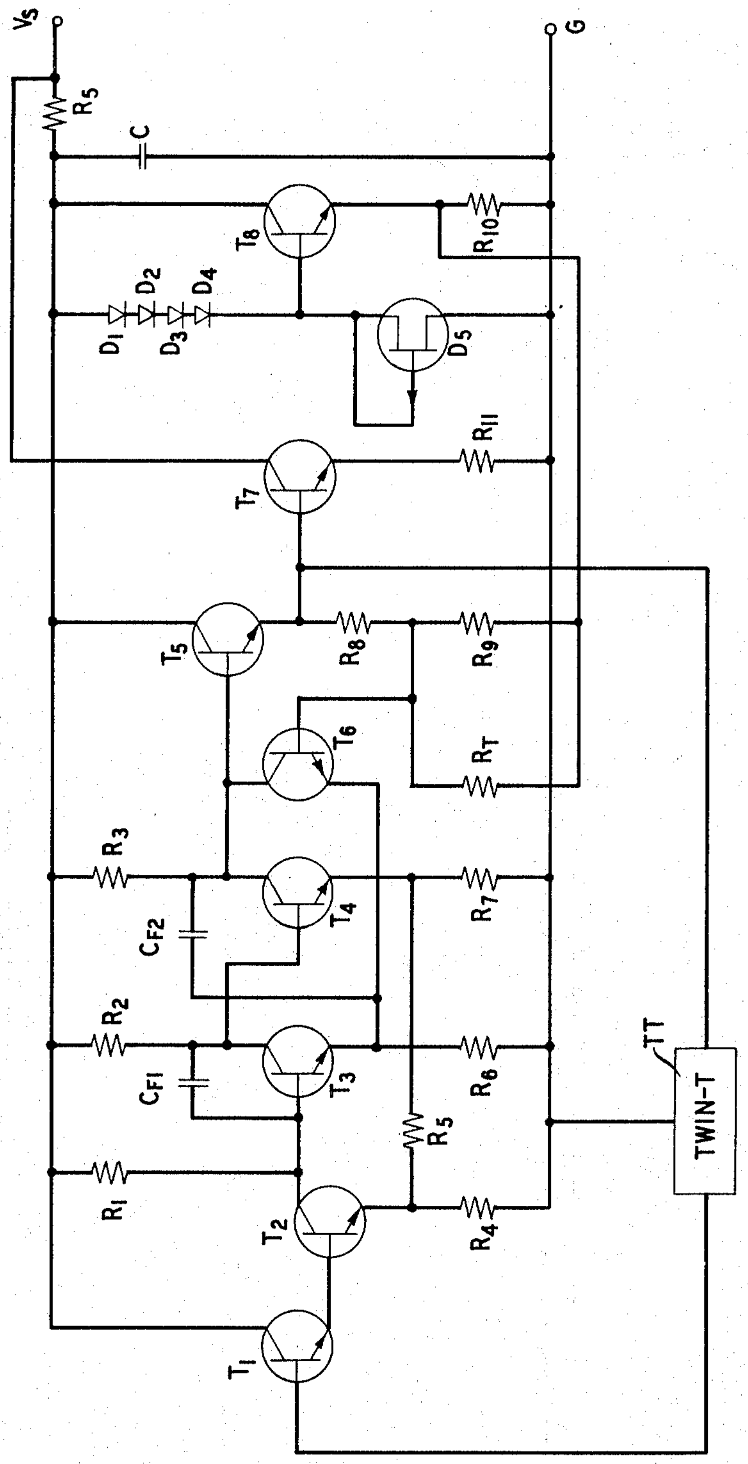
FIG. 1 is a schematic circuit diagram of an oscillator in accordance with the invention.

The basic portion of the circuit of FIG. 1 is simply a multistage transistor amplifier, incorporating transistors $T_1$ through $T_5$, which employs a positive feedback path through a twin-T notch filter TT to effect oscillation. Switching a combined pair of circuits of this general type by means of a telephone pushbutton dial is well known in the art as shown, for example, in the Breeden-Rickert patent cited above. It is to be understood, therefore, that the block designated TT in FIG. 1 is also intended as a representation of an additional similar circuit together with the switching required to generate multifrequency signal combinations for telephone dialing.

In the circuit of FIG. 1 marked departures from the prior art occur in a multifunction employment of transistor $T_1$, in the use of transistor $T_4$ as a current source, in the use of transistor $T_6$ for gain compression and in the configuration of an equalizer circuit which includes transistor $T_8$. These features and additional features are fully described in the following detailed discussion.

Input transistor $T_1$, which is connected as an emitter follower, provides level shifting of one $V_{BE}$, a degree of multiplication of the input impedance and a reduction of bias current which flows through the twin-T filter TT. Transistors $T_2$, $T_3$ and $T_4$ provide voltage gain on the order of 6,000 which is reduced substantially, however, to 125, for example, by a feedback resistor $R_5$ which is connected between the emitters of transistors $T_4$ and $T_2$. These feedback termination points are chosen to provide high impedance to transistor $T_2$ and to make transistor $T_4$ a high impedance current source. Because of the large feedback factor, the characteristics of the circuit can be maintained with relatively low beta transistors. The gain which is achieved is fixed by a ratio of the resistors $R_3$, $R_4$, $R_5$ and $R_7$. Other factors affecting gain become negligible owing to the large feedback factor. By the employment of diffused contacts on all resistors, excellent resistor tracking is achieved. For example, in one embodiment of the type shown in FIG. 1, measured amplifier gain (with the limiter portion disabled) was constant within plus or minus one percent over a temperature range of −50° C to +110° C.

Figure 2:
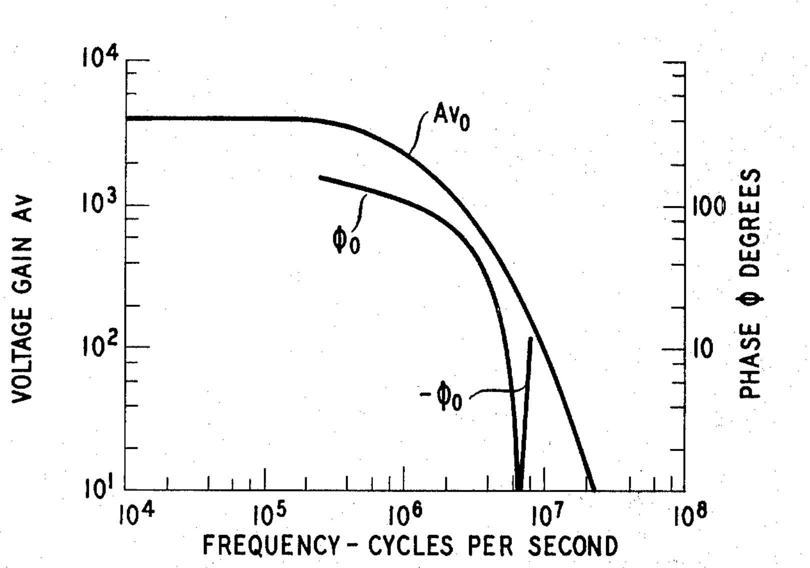
FIG. 2 is a calculated plot of the open loop voltage gain for the circuit of FIG. 1.

From the FIG. 2 plot of calculated open loop gain and phase of the circuit of FIG. 1, it may be noted that the low frequency gain is reduced to 4,000 owing to the fact that the emitter follower transistor $T_1$ has a gain of only 0.66 when resistor $R_5$ is open. The input impedance at transistor $T_2$ is only 10K ohms on open loop and is increased to 400K ohms with resistor $R_5$ closed. Capacitor $C_{F1}$ provides the necessary feedback compensation so that with resistor $R_5$ closed, the amplifier is stable without peaking and a high frequency roll-off occurs so that typical gain of approximately −80 dB is achieved at 100 MHz. This level of gain is desirable inasmuch as the high input impedance permits a certain amount of pickup of FM broadcast stations.

Figure 3:
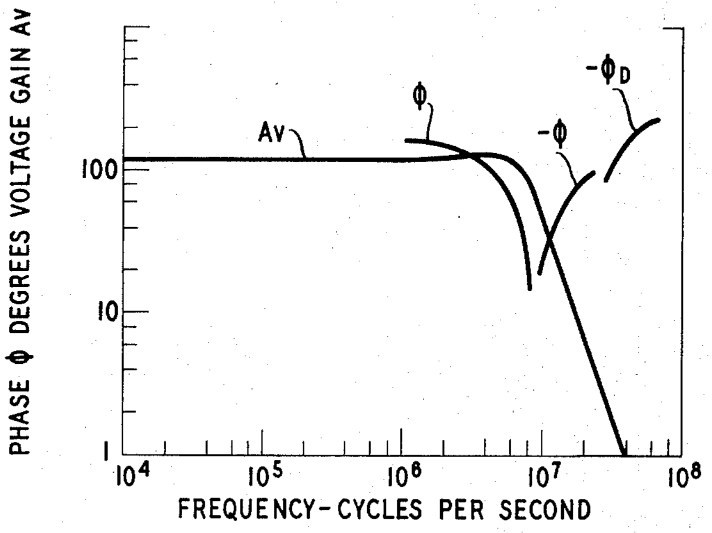
FIG. 3 is a calculated gain-phase plot of the circuit of FIG. 1 without a $C_{F2}$ feedback capacitor.
Figure 4:
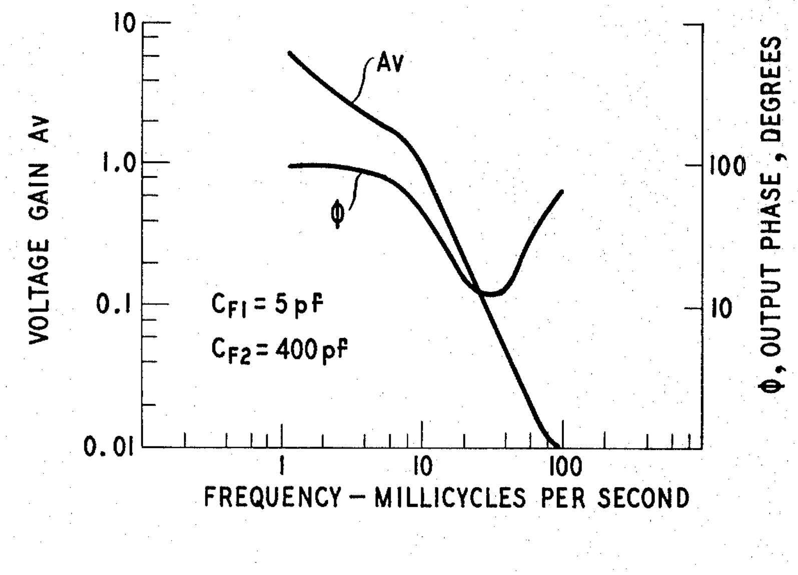
FIG. 4 is a gain-phase plot of the circuit of FIG. 1 with the $C_{F2}$ feedback capacitor.

The FIG. 3 plot shows calculated phase conditions occurring in the circuit of FIG. 1 when the closed loop gain is set to 125. The phase shift designated $\Phi$ is that change in phase which occurs through the amplifier, and the phase difference $\Phi_n$ is that difference in phase which occurs at the terminal points of the feedback resistor $R_5$. For the internal loop, a phase margin of 45° and a gain margin of 6 dB are evident. Since the phase shift $\Phi$ passes through zero at about 10 MHz, a further compensation is necessary to obtain short circuit stability which is required to accommodate the twin-T filter TT. An external feedback capacitor $C_{F2}$ is employed to reduce the gain to approximately one at 10 MHz which improves the phase as is illustrated by the calculated plot of FIG. 4. At unity gain it may be seen that the phase is approximately 48° and for higher frequencies, the gain falls off at 46 dB per decade. Below 10 MHz, gain increases generally at the rate of about 20 dB per decade of frequency, giving a 3 dB down gain at 90 KHz.

Transistor $T_4$ is designed in accordance with the invention as a current source so that little or no clipping occurs when transistor $T_6$, the gain compression transistor, draws excessive current when performing its gain-compressing function. As the voltage across resistor $R_9$ increases in the positive direction, the collector current of transistor $T_6$ increases, shunting some current away from the node of resistor $R_3$ and the collector of transistor $T_4$, thus compressing the positive voltage excursion which occurs when there is a decrease in the transistor $T_4$ collector current. For negative going swings, transistor $T_6$ cuts off and linear operation results. With nothing more, the asymmetrical compression described would cause the d.c. level to decrease by shifting the quiescent level of transistor $T_6$ to a lower value, thereby reducing the compression. Such self-defeating action is prevented in accordance with the invention by the presence of 100 percent d.c. feedback from the output of the emitter follower transistor $T_5$ to the input of transistor $T_1$ through the twin-T filter circuit TT. This feedback loop keeps the d.c. level at the emitter of transistor $T_5$ essentially independent of signal level.

Figure 5:
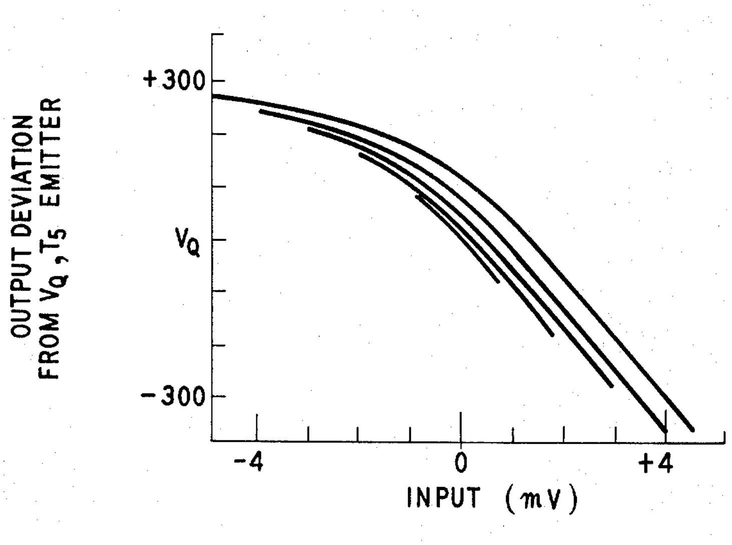
FIG. 5 is a plot of the limiting output versus input for the circuit of FIG. 1.

The compression and compensating d.c. shift may be seen in the plot of FIG. 5. For the conditions illustrated in FIG. 5, no a.c. feedback is allowed. When used with a twin-T notch filter as a selective amplifier or oscillator as shown in the circuit of FIG. 1, the linearized effect of negative feedback is of course added. In FIG. 5 the quiescent level with no signal is translated to the center of the plot. Signal levels of 1 to 5 millivolt steps (peak) are shown with the corresponding outputs. For the one millivolt level the output is linear and no d.c. shift occurs. With increasing levels, however, the logarithmic voltage gain compression for positive swings (negative input) is evident, together with positive output shift at the zero output voltage axis. The average output voltage is maintained constant within approximately 0.2 percent of the quiescent value by the d.c. feedback. It can be shown that gain compression may be mathematically described by the following equation:

$$\ln\left\{\frac{R_3}{-\left(\frac{\partial V}{\partial I_{c4}}\right)}-1\right\}=\ln\left(\frac{q\gamma}{KT}I_{6Q}R_3\right)+\frac{q\gamma}{KT}V \qquad (1)$$

where $V$= voltage swing at $T_5$ emitter
$Q$ indicates quiescent value ($V$=0)
$G$= output conductance of $T_4$
$\gamma$ = fraction of $V$ which appears at base emitter of $T_6$.

Equation (1) may be written in normalized units as follows:

$$f(G)=\ln\left\{\frac{1}{-\frac{\partial\hat{V}}{\partial\hat{I}_{c4}}}-1\right\}=\ln\left(\hat{I}_{6Q}\right)+\hat{V} \qquad (2)$$

where:

$$\hat{V}=\frac{\gamma}{\frac{KT}{q}}V$$

$$\hat{I}=\frac{\gamma R_3}{\frac{KT}{q}}I$$

The log compression is described by two asymptotes. For $\hat{V}=0$:

$$f(G)=\ln\left\{\frac{1}{-\frac{\partial\hat{V}}{\partial\hat{I}_{c4}}}\right\}=\ln\hat{I}_{6Q} \qquad (3)$$

For large $\hat{V}$:

$$f(G)=\ln\left\{\frac{1}{-\frac{\partial\hat{V}}{\partial\hat{I}_{c4}}}-1\right\}\simeq\hat{V} \qquad (4)$$

Figure 6:
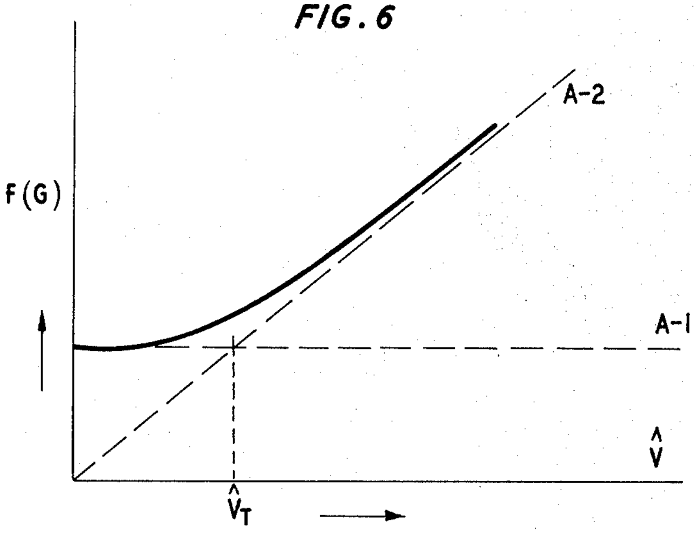
FIG. 6 is a plot of the equations illustrating the gain compression function of the circuit of FIG. 1.

The two asymptotes represented by equations (3) and (4) above are illustrated graphically as A-1 and A-2, respectively, in the plot of FIG. 6. The compression threshold $\hat{V}_T$ may be defined as the crossover point of these two asymptotes. Two adjustable parameters exist. The compression slope is determined by $\gamma$ and the threshold is determined by the current level through transistor $T_6$. It should also be noted that $V_T$ is a function of temperature and that the voltage at the emitter of transistor $T_5$ is determined primarily by the $V_{BE}$ drop of transistors $T_1$ and $T_2$ and thus also varies with temperature.

In accordance with the invention, a best fit of these variations is achieved by causing $\gamma$ to change with temperature. For example, in one embodiment of the invention, resistors $R_8$ and $R_9$ are silicon with a temperature coefficient of about 0.22 percent per degree centigrade. The tap point between resistors $R_8$ and $R_9$ may be chosen so that when resistor $R_9$ is shunted with a low temperature coefficient resistor $R_T$ and adjusted for a particular oscillator level such as 250 mv rms, the $\gamma$ is optimized for minimum change of amplitude over a wide temperature range such as $-40°$ C to $+85°$ C.

As indicated above, transistor $T_1$ provides level shifting of one $V_{BE}$, some multiplication of input impedance and a reduction of bias current which flows through the twin-T filter TT. When resistance switching is used to change frequencies, a corresponding level shift occurs at the output, owing to the drop across the twin-T filter, and this action, in turn, affects the compression threshold. This effect is minimized by causing $T_1$ bias current to be sufficiently low.

The table below lists the output spectrum for fundamental outputs of 100, 200, 250, 300 mv rms with the twin-T feedback loop open.

Output Spectrum With Compression
(No external a.c. feedback)

| Fundamental Level | Second Harmonic 5 mv | Third Harmonic100 mv rms |
|---|---|---|
| 200 | 35 | |
| 250 | 58 | |
| 300 | 82 | Trace |

The third harmonic is discerned only for the 300 mv rms of fundamental output.

The remainder of the circuit includes a final signal output stage consisting of transistor $T_7$ with its collector connected directly to the output side of resistor $R_S$ and its emitter connected to ground by way of a resistor $R_{11}$. When the circuit is used to generate multifrequency telephone dial signals, it is desirable to have tone generation amplitude vary in accordance with the length of the loop or the distance between the phone and the central office. Owing to the d.c. drop in a telephone line, the voltage $V_S$ available at the station set is inversely related to the line length. In accordance with the invention, loop length compensation or equalization is realized by the combination of transistor $T_8$, connected across the line through the resistors $R_S$ and $R_{10}$, and its base current control path which includes the diodes $D_1 - D_4$ and shorted JFET $D_5$ which operates as a current drain. For low values of line voltage $V_S$, typically associated with long loops, transistor $T_8$ is held near cutoff while for short loops the diodes $D_1 - D_4$, and hence $T_8$, all conduct heavily thus supplying a regulated voltage to the amplifier. If the line resistor $R_S$ is made equal to 1K ohms, then for every volt increase of $V_S$ the current through resistor $R_S$ increases by 1 ma. This added current is passed by transistor $T_8$. By a proper choice of resistor $R_{10}$, the voltage at the base of transistor $T_6$ will shift the compression threshold voltage in the direction of compression to a lower voltage level. Thus if the value of resistor $R_{10}$ is selected at 10 ohms for example, the bias point is shifted by 10 mv for each 1 ma through resistor $R_{10}$ (or each 1 volt increase of $V_S$) which reduces the peak amplitude at the emitter of transistor $T_5$ by approximately $R_8 + R_9/R_9 \times 10$ mv. Since resistor $R_{10}$ is an independent choice, the degree of compression for loop length may be selected to any desired value.

A table of typical operating characteristics for the circuit of FIG. 1 is as follows:

| | |
|---|---|
| Input Impedance | 10 Meg. |
| Output Impedance | 125 Ω |
| Voltage Gain (Closed Loop) | 125 |
| Bandwidth | 10 Mc/s |
| Oscillator Amplitude (Internal regulator) | 250 Mv (rms) |
| Oscillator Frequency Stability | ±.02% |
| Power (Internal regulator) | +6 to +16V through 1K |
| Distortion (Oscillator) | 2nd Harmonic −40db<br>3rd Harmonic −50db |
| Operating Temperature Range | −40, +100°C |
| Output Transistor | User controlled |

It is to be understood that the embodiment described herein is merely illustrative of the principles of the invention. Various modifications may be effected by persons skilled in the art without departing from the spirit and scope of the invention.

What is claimed is:

1. An oscillatory signal generator circuit comprising, in combination:

a plurality of transistor amplifier stages connected in cascade;

means including a first additional transistor connected in a first feedback loop between two of said stages for compressing amplifier gain as a predetermined function of amplitude;

signal tuning means;

means including a multifunction second additional transistor for supplying a relatively low impedance drive for said tuning means and for providing feedback to control the operation of said first additional transistor;

an output point;

and a feedback path connecting an electrode of said second additional transistor to said output point and thence to an input electrode of a transistor of one of said stages by way of said tuning means.

2. An oscillatory signal generator comprising, in combination:

an amplifier including a plurality of single transistor stages connected in cascade;

means including a first feedback path between a junction point common to an electrode of each of two of said transistors and an input electrode of another one of said transistor stages for compressing the gain of said amplifier as a predetermined function of amplitude, said path including the collector-to-emitter path of a first additional transistor;

a generator output point;

a second feedback path connecting the output electrode of one of said two transistors to the input electrode of said last named transistor by way of the base-to-collector path of said first additional transistor;

signal tuning means;

a third feedback path connecting said last named output electrode to the input electrode of the input one of said single transistor stages by way of said signal tuning means;

and means connecting said output electrode to said output point.

3. Apparatus in accordance with claim 2 including a fourth feedback path connecting two of said stages.

4. Apparatus in accordance with claim 3 wherein said input one of said transistor stages is connected in emitter-follower configuration thereby providing a level shifting function of one base-to-emitter voltage drop, multiplication of input impedance and a limitation on bias current flowing through said signal tuning means.

5. Apparatus in accordance with claim 2 wherein said stages include an input emitter-follower stage, followed by second, third and fourth common emitter stages, and a fourth feedback path including a resistive element connecting the emitter electrodes of said second and fourth common emitter stages.

6. Apparatus in accordance with claim 5 including a first capacitive element connecting the collector and base electrodes of the transistor of said third stage and a second capacitive element connecting the collector electrode of said fourth stage to the common junction of the emitter electrodes of said third stage and of said first additional transistor.

7. Apparatus in accordance with claim 3 including a reference potential terminal and an output transistor having its collector-emitter path connected between said output point and said reference potential terminal.

8. Apparatus in accordance with claim 7 including an equalizer circuit in parallel relation to said collector-emitter path of said output transistor, said equalizer circuit comprising a path including a resistor and a plurality of series connected diodes shunting said last named collector-emitter path, an equalizer transistor having its collector-emitter path connected between one terminal of said last named resistor and said reference potential terminal, and means connecting a terminal of one of said diodes to the base electrode of said equalizer transistor.

9. An oscillatory signal generator comprising, in combination:

an input point, an output point, and a point of reference potential;

a plurality of transistors each having its collector-emitter path connected between said output point and said point of reference potential;

an input transistor having its emitter electrode connected to the base electrode of a first one of said plurality of transistors, its base electrode connected to said input point, and its collector electrode connected to said output point;

signal tuning means;

a first feedback path including said tuning means connected between the emitter electrode of a fourth one of said plurality of transistors and said input point;

a second feedback path including a resistive element connected between a first and a third one of said plurality of transistors;

a third feedback path including the collector-emitter path of an additional transistor connected between the emitter electrode of a second one of said transistors and a junction common to the collector of said third transistor and to the base of said fourth transistor, said additional transistor effecting gain compression of said signal as a predetermined function of amplitude; and a fourth feedback path including a resistive element and the base-collector path of said additional transistor connected between the emitter and base of said fourth transistor;

a fifth one of said transistors being an output stage having its base electrode connected to the emitter electrode of said fourth transistor.

10. Apparatus in accordance with claim 9 including an equalization circuit connected between said output point and said point of reference potential, said equalization circuit comprising a sixth one of said transistors connected between said output point and said point of reference potential, a plurality of diodes connected between said last two named points and means connecting a terminal of one of said diodes to the base electrode of said last named transistor.

* * * * *